United States Patent
Fujita et al.

(10) Patent No.: US 7,348,077 B2
(45) Date of Patent: Mar. 25, 2008

(54) MAGNETIC RECORDING MEDIUM AND MAGNETIC RECORDING APPARATUS

(75) Inventors: Enji Fujita, Kashiwa (JP); Hideaki Yamanaka, Toride (JP); Tsuyoshi Onuma, Moriya (JP); Satoshi Matsunuma, Kamakura (JP); Akira Yano, Moriya (JP); Tetsunori Koda, Tsukuba (JP); Katsusuke Shimazaki, Toride (JP)

(73) Assignee: Hitachi Maxwell Ltd, Osaka (JP)

( * ) Notice: Subject to any disclaimer, the term of this patent is extended or adjusted under 35 U.S.C. 154(b) by 398 days.

(21) Appl. No.: 10/930,755

(22) Filed: Sep. 1, 2004

(65) Prior Publication Data

US 2005/0048321 A1    Mar. 3, 2005

(30) Foreign Application Priority Data

Sep. 2, 2003  (JP) .............................. 2003-309558

(51) Int. Cl.
  *G11B 5/66*  (2006.01)
  *G11B 5/70*  (2006.01)
(52) U.S. Cl. .................................. 428/828.1
(58) Field of Classification Search ................ 428/827, 428/828.1, 829
  See application file for complete search history.

(56) References Cited

U.S. PATENT DOCUMENTS 7,144,640 B2* 12/2006 Hee et al. .................... 428/827

2004/0184176 A1* 9/2004 Shimazaki et al. ........... 360/59

FOREIGN PATENT DOCUMENTS

JP    A-2002-074638    3/2002
JP    A 2003-45014    2/2003

OTHER PUBLICATIONS

Machine translation of Takeuchi et al., JP 2002-216333, Aug. 2008.*

* cited by examiner

*Primary Examiner*—Holly Rickman
(74) *Attorney, Agent, or Firm*—Oliff & Berridge, PLC

(57) ABSTRACT

A magnetic recording medium based on the perpendicular magnetic recording system includes a substrate; a back layer which is formed on the substrate and which is formed of a soft magnetic material; an in-plane magnetized layer which is formed on the back layer and which has in-plane magnetization; and a recording layer which is formed on the in-plane magnetized layer and which has perpendicular magnetization, wherein the in-plane magnetized layer has a coercivity in an in-plane direction larger than a magnetic field generated by residual magnetization in a perpendicular direction of the recording layer. The influence on the reproduction output, caused by the mirror image effect of the soft magnetic back layer is reduced in wide range recording densities, thereby improving the resolution by decreasing the difference between the reproduction outputs of the magnetic recording medium at the low recording density and at the high recording density.

9 Claims, 6 Drawing Sheets

MAGNETIC RECORDING MEDIUM AND MAGNETIC RECORDING APPARATUS

BACKGROUND OF THE INVENTION

1. Field of the Invention

The present invention relates to a magnetic recording medium and a magnetic recording apparatus. In particular, the present invention relates to a magnetic recording medium and a magnetic recording apparatus based on the perpendicular magnetic recording system.

2. Description of the Related Art

In response to the development of the advanced information society, the needs are overwhelmingly increased for the realization of the large capacity and the high density of the information-recording apparatus. A magnetic recording apparatus is known as one of the information-recording apparatuses which respond to such needs. The magnetic recording apparatus is used as the large capacity recording apparatus including, for example, large scale servers, parallel type computers, personal computers, network servers, movie servers, and mobile PC's. The magnetic recording apparatus includes a magnetic recording medium on which information is recorded, and a magnetic head which records and reproduces information on the magnetic recording medium. The magnetic recording medium includes a disk-shaped substrate on which a ferromagnetic thin film such as cobalt alloy is formed as a recording layer, for example, by the sputtering method. A protective layer and a lubricant film are formed on the recording layer in order to enhance the sliding resistance and the corrosion resistance.

As the large capacity of the magnetic recording apparatus is progressively realized, it is advanced to improve the recording density of the magnetic recording medium by recording fine and minute recording magnetic domains in the recording layer of the magnetic recording medium. The perpendicular magnetic recording system attracts the attention as a method for finely recording the recording magnetic domains. In the perpendicular magnetic recording system, the magnetic recording is performed by forming magnetic domains having perpendicular magnetization in the recording layer by using the magnetic recording medium having the recording layer which exhibits the perpendicular magnetization. In the case of the perpendicular magnetic recording system as described above, the recording density of the magnetic recording medium can be increased, because fine and minute magnetic domains can be formed in the recording layer.

In the magnetic recording medium based on the perpendicular magnetic recording system, a layer (hereinafter referred to as "soft magnetic back layer" or "back layer"), which is formed of a soft magnetic material, is provided between the substrate and the recording layer. Accordingly, it is possible to converge and focus the magnetic field to be applied to the recording layer when information is recorded. It is possible to perform the recording on the magnetic material having higher magnetic anisotropy.

A technique has been hitherto suggested (see, for example, Japanese Patent Application Laid-open No. 2003-45014, p. 3, FIGS. 1 and 3 to 7), in which an in-plane magnetized film is provided between the back layer and the perpendicular magnetized film (recording layer) to reduce the noise caused by the disturbance of magnetization due to the interaction between the back layer and the perpendicular magnetized film.

In the case of the magnetic recording medium suggested by Japanese Patent Application Laid-open No. 2003-45014, the reverse magnetic field is generated in an in-plane magnetized film so that the magnetic pole, which is induced in the back layer by the perpendicular magnetized film, is counteracted by providing the in-plane magnetized film between the back layer and the perpendicular magnetized film. In particular, when the relationship of (saturated magnetic flux density of perpendicular magnetized film×film thickness)<(saturated magnetic flux density of in-plane magnetized film×film thickness) is satisfied between the perpendicular magnetized film and the in-plane magnetized film, the magnetic circuit, which is formed by the magnetic field of the perpendicular magnetized film, is closed by the in-plane magnetized film to give a structure in which any induced magnetic pole is not formed in the back layer by the leak magnetic flux of the perpendicular magnetized film. That is, in the case of the magnetic recording medium suggested by Japanese Patent Application Laid-open No. 2003-45014, the magnetic flux is refluxed between the in-plane magnetized film and the perpendicular magnetized film in order not to generate any induced magnetic pole in the back layer by the leak magnetic flux of the perpendicular magnetized film.

By the way, in the case of the magnetic recording apparatus based on the use of the magnetic recording medium of the perpendicular magnetic recording system, it is demanded to further improve the resolution defined by (reproduction output at high recording density/reproduction output at low recording density)×100 [%] in order to respond not only to the realization of the high recording density of information but also to a variety of ways of use and standards.

SUMMARY OF THE INVENTION

The present invention has been made in order to respond to the demand as described above, an object of which is to provide a magnetic recording medium based on the perpendicular magnetic recording system having higher resolution.

According to a first aspect of the present invention, there is provided a magnetic recording medium comprising a substrate; a back layer which is formed on the substrate and which is formed of a soft magnetic material; an in-plane magnetized layer which is formed on the back layer and which has in-plane magnetization; and a recording layer which is formed on the in-plane magnetized layer and which has perpendicular magnetization; wherein the in-plane magnetized layer has a coercivity in an in-plane direction which is larger than a magnetic field generated by residual magnetization in a perpendicular direction of the recording layer.

In the magnetic recording medium of the present invention, the in-plane magnetized layer, which has the coercivity in the in-plane direction larger than the magnetic field generated by the residual magnetization in the perpendicular direction of the recording layer, is provided between the recording layer and the back layer. Accordingly, it is possible to reduce the change of the influence on the reproduction output caused by the mirror image magnetic charge of the back layer depending on the recording density. As a result, the difference is decreased between the reproduction output of the magnetic recording medium at the low recording density and the reproduction output of the magnetic recording medium at the high recording density. It is possible to improve the resolution.

DESCRIPTION OF THE PREFERRED EMBODIMENTS

Figure 1:
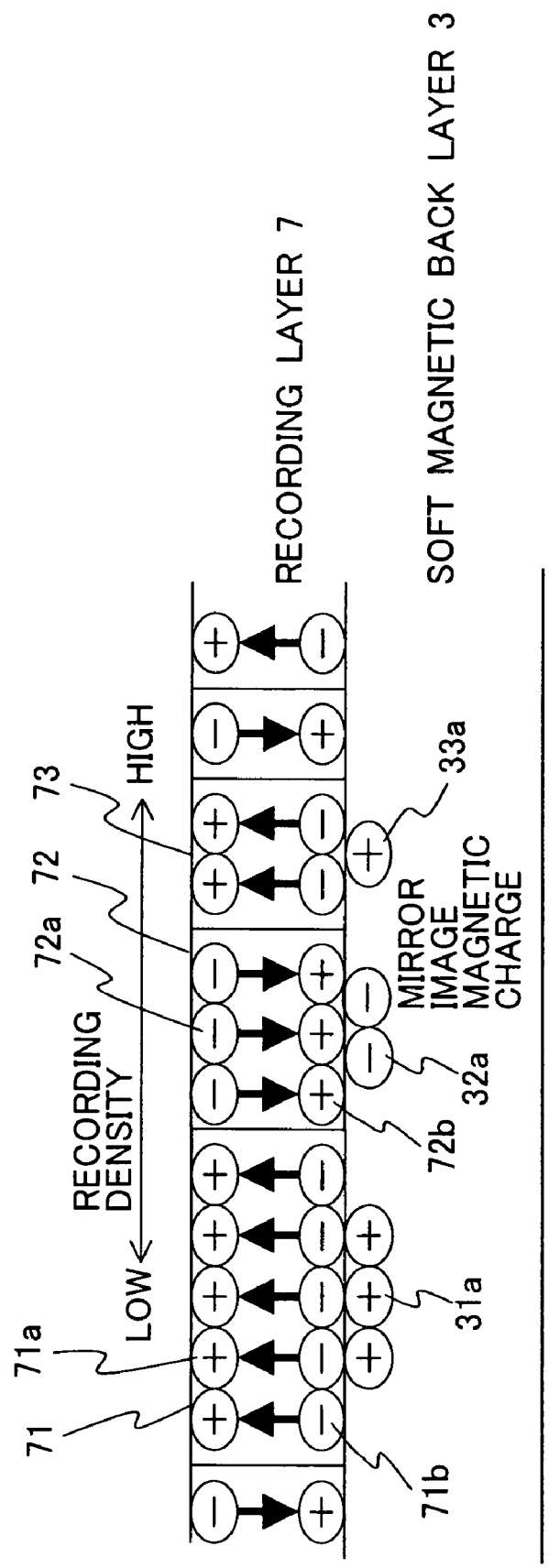
FIG. 1 shows a situation of a magnetization state in relation to a recording layer and a soft magnetic back layer of a conventional magnetic recording medium based on the perpendicular recording system.

At first, an explanation will be made about a magnetization state of a conventional magnetic recording medium based on the perpendicular magnetic recording system in which a recording layer is formed on a soft magnetic back layer. FIG. 1 schematically shows a magnetization state between the soft magnetic back layer and the recording layer. As shown in FIG. 1, in the case of the conventional magnetic recording medium based on the perpendicular magnetic recording system, positive and negative magnetic charges are generated on both surfaces of the recording layer 7 depending on the directions of magnetization (thick arrows in FIG. 1) of magnetic domains (recording magnetic domains) recorded in the recording layer 7. For example, when the magnetization is recorded in the upward direction as in the recording magnetic domain 71 shown in FIG. 1, then the positive magnetic charge 71a is generated on the upper surface of the recording magnetic domain 71, and the negative magnetic charge 71b is generated on the lower surface (boundary surface on the side of the soft magnetic back layer 3) of the recording magnetic domain 71. Reversely, when the magnetization is recorded in the downward direction as in the recording magnetic domain 72 shown in FIG. 1, then the negative magnetic charge 72a is generated on the upper surface of the recording magnetic domain 72, and the positive magnetic charge 72b is generated on the lower surface (boundary surface on the side of the soft magnetic back layer 3) of the recording magnetic domain 72.

On the other hand, as shown in FIG. 1, a magnetic charge (mirror image magnetic charge), which counteracts the magnetic charge generated at the boundary surface of the recording layer 7 on the side of the soft magnetic back layer 3, is generated at the boundary surface of the soft magnetic back layer 3 on the side of the recording layer 7. For example, the negative magnetic charge 71b is generated at the boundary surface of the recording magnetic domain 71 on the side of the soft magnetic back layer 3 in FIG. 1. Therefore, the positive mirror image magnetic charge 31a is generated at the boundary surface of the soft magnetic back layer 3 on the side of the recording layer 7 under the recording magnetic domain 71. Therefore, in the case of the recording magnetic domain 71, the magnetic charges are counteracted at the boundary surface between the recording layer 7 and the soft magnetic back layer 3.

When information is reproduced by detecting the leak magnetic field from the recording magnetic domain 71 in the magnetization state as shown in FIG. 1, the influence of the leak magnetic field generated from the boundary between the recording magnetic domain 71 and the soft magnetic back layer 3 is decreased (mirror image effect), because almost all magnetic charges are counteracted at the boundary between the recording magnetic domain 71 and the soft magnetic back layer 3. Therefore, the leak magnetic field, which is detected from the recording layer 7, is principally the leak magnetic field obtained from the magnetic charge generated at the upper surface of the recording layer 7. Therefore, it is possible to reproduce information of the recording magnetic domain 71 with good sensitivity.

When the recording density is further increased (for example, not less than 1,000 kFCI), and the recording magnetic domain formed in the recording layer 7 has a smaller size, then the mirror image magnetic charge of the soft magnetic back layer 3 cannot follow the magnetization reversal of the recording layer 7, and the mirror image effect is hardly caused at the boundary between the recording layer 7 and the soft magnetic back layer 3, because the coercivity is small in view of the original function of the soft magnetic back layer 3, and any minute magnetic domain is hardly formed.

As shown in FIG. 1, the magnetic charge, which is generated at the upper surface of the recording magnetic domain in the recording layer 7, has the sign which is opposite to the sign of the magnetic charge generated at the surface of the recording magnetic domain on the side of the soft magnetic back layer 3. Therefore, the direction of the leak magnetic field generated from the upper surface of the recording magnetic domain is opposite to the direction of the leak magnetic field generated from the surface of the recording magnetic domain on the side of the soft magnetic back layer 3. Therefore, when information is reproduced from any small recording magnetic domain in which no mirror image effect is generated, then the leak magnetic field, which is generated from the upper surface of the recording magnetic domain, is partially counteracted by the leak magnetic field generated from the surface of the recording magnetic domain on the side of the soft magnetic back layer 3, and the reproduction output is decreased.

As described above, in the case of the magnetic recording medium based on the perpendicular magnetic recording system shown in FIG. 1, the reproduction output is increased owing to the mirror image effect of the soft magnetic back layer at the low recording density. However, as the recording density is increased, the mirror image effect of the soft magnetic back layer cannot follow. Therefore, the reproduction output is not increased at the high recording density. As a result, the following problem arises. That is, the difference is increased between the reproduction output of the magnetic recording medium at the low recording density and the reproduction output of the magnetic recording medium at the high recording density. The resolution, which is defined by (reproduction output at high recording density/reproduction output at low recording density)×100 [%], is lowered.

Figure 2:
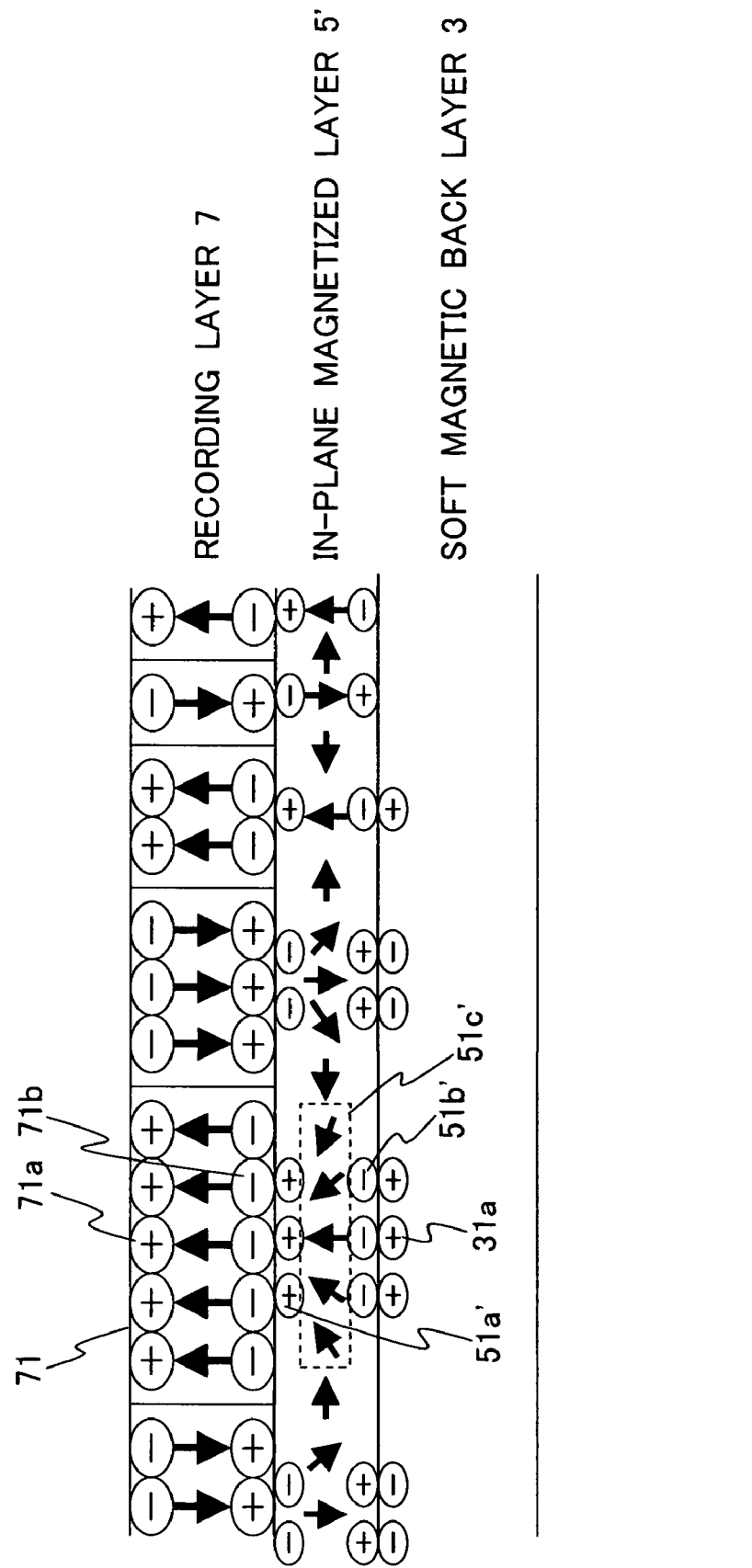
FIG. 2 shows a situation of a magnetization state in relation to a recording layer, an in-plane magnetized layer, and a soft magnetic back layer of another conventional magnetic recording medium based on the perpendicular recording system.

Next, an explanation will be made about a magnetization state of a magnetic recording medium based on the perpendicular magnetic recording system provided with an in-plane magnetized layer between a soft magnetic back layer and a recording layer as in the magnetic recording medium described in Japanese Patent Application Laid-open No. 2003-45014, in order to reduce the noise caused by the disturbance of the magnetization due to the interaction between the recording layer and the soft magnetic back layer. FIG. 2 schematically shows a magnetization state in relation to the recording layer, the soft magnetic back layer, and the in-plane magnetized layer of the magnetic recording medium provided with the in-plane magnetized layer between the soft magnetic back layer and the recording layer.

In the case of the magnetic recording medium as described in Japanese Patent Application Laid-open No. 2003-45014, the magnetic flux is refluxed between the recording layer and the in-plane magnetized layer as described above. Therefore, as shown in FIG. 2, the magnetization of the in-plane magnetized layer 5' is formed so that the magnetic flux is refluxed between the recording layer 7 and the in-plane magnetized layer 5'. As shown in FIG. 2, in order to reflux the magnetic flux between the recording layer 7 and the in-plane magnetized layer 5', it is necessary that the magnetization of the in-plane magnetized layer 5' is rotated in response to the magnetic field (drifting magnetic field) generated by the residual magnetization of the recording layer 7. Therefore, in the case of the magnetic recording medium as described in Japanese Patent Application Laid-open No. 2003-45014, it is considered that the coercivity of the in-plane magnetized film is smaller than the magnetic field (drifting magnetic field) generated by the residual magnetization of the recording layer.

In the case of the magnetic recording medium as described in Japanese Patent Application Laid-open No. 2003-45014, as shown in FIG. 2, the magnetization of the in-plane magnetized layer 5' is formed so that the magnetic flux is refluxed between the recording layer 7 and the in-plane magnetized layer 5'. Therefore, it is considered that the mirror image magnetic charge is generated on the surface of the in-plane magnetized layer 5' on the side of the recording layer 7 so that the magnetic charge generated on the surface of the recording layer 7 on the side of the in-plane magnetized layer 5' is counteracted depending on the direction of magnetization (thick arrows shown in FIG. 2) of the recording magnetic domain of the recording layer 7. For example, as for the recording magnetic domain 71 of the recording layer 7 shown in FIG. 2, the negative magnetic charge 71b is generated on the surface of the recording magnetic domain 71 on the side of the in-plane magnetized layer 5'. Therefore, the positive magnetic charge 51a' is generated on the surface of the in-plane magnetized layer 5' on the side of the recording magnetic domain 71. Accordingly, the negative magnetic charge 51b' is generated on the surface of the in-plane magnetized layer 5' on the side of the soft magnetic back layer 3. That is, as shown in FIG. 2, the magnetization 51c', which has not only the component in the in-plane direction but also the component in the perpendicular direction, is generated in the area of the in-plane magnetized layer 5' under the recording magnetic domain 71.

As shown in FIG. 2, in the case of the magnetic recording medium in which the magnetic flux is refluxed between the recording layer 7 and the in-plane magnetized layer 5', the mirror image magnetic charge appears on the surface of the in-plane magnetized layer 5' on the side of the recording layer 7 at the low recording density. However, the mirror image effect of the in-plane magnetized layer 5' cannot follow at the high recording density in the same manner as in the magnetic recording medium shown in FIG. 1. Therefore, the reproduction output is not increased at the high recording density. As a result, the following problem arises. That is, the difference is increased between the reproduction output of the magnetic recording medium at the low recording density and the reproduction output of the magnetic recording medium at the high recording density, and the resolution is lowered.

The problem, which is caused by the high recording density as described above, is solved by the magnetic recording medium of the present invention.

In the magnetic recording medium of the present invention, the in-plane magnetized layer, which has the coercivity in the in-plane direction larger than the magnetic field generated by the residual magnetization in the perpendicular direction of the recording layer, is provided between the recording layer and the soft magnetic back layer. The reason, why the high resolution can be realized by providing the in-plane magnetized layer as described above, will be explained with reference to FIG. 3.

Figure 3:
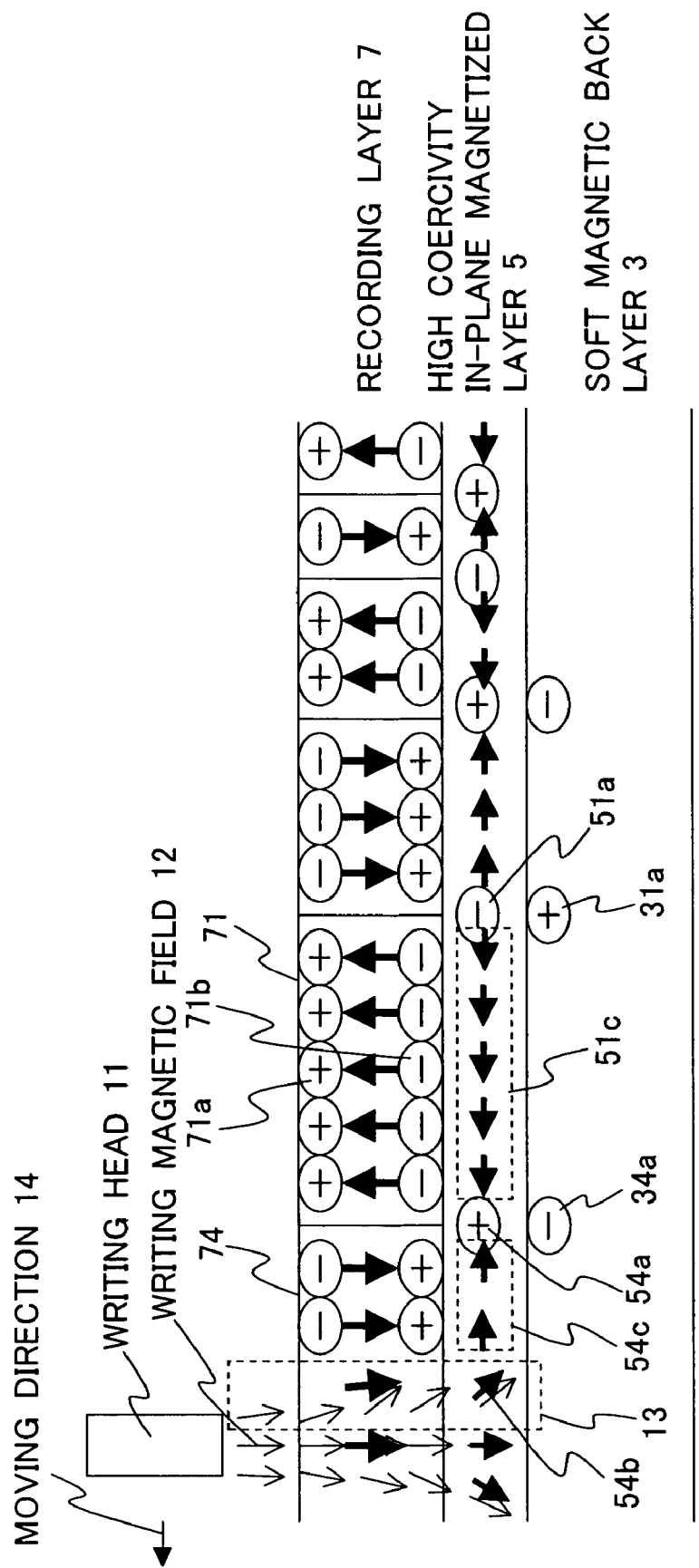
FIG. 3 shows a situation of a magnetization state in relation to a recording layer, an in-plane magnetized layer, and a soft magnetic back layer of a magnetic recording medium based on the perpendicular recording system according to the present invention.

In an example shown in FIG. 3, information is recorded in the recording layer 7 while moving a writing head 11 in the direction of the arrow 14 in the drawing. In this case, the recording magnetic field 12, which is generated from the writing head 11, is spread to some extent. Therefore, as shown in FIG. 3, the recording magnetic field 13, which is generated at the downstream position in the traveling direction of the writing head 11, has not only the perpendicular component but also the in-plane component. Therefore, the in-plane magnetized layer (high coercivity in-plane magnetized layer) 5 is once magnetized in the same direction as the direction of the recording magnetic field 13 at the downstream position from the writing head 11. However, the in-plane magnetized layer 5 has the strong magnetic anisotropy in the in-plane direction. Therefore, as the influence of the recording magnetic field 12 is decreased, the direction of magnetization of the in-plane magnetized layer 5 is directed in the same direction as that of the in-plane direction component of the recording magnetic field 13 at the downstream position from the writing head 11.

This situation will be explained more specifically below. As shown in FIG. 3, when the writing magnetic field 12 of the writing head 11 is directed downwardly, the recording magnetic field 13, which is generated at the downstream position in the traveling direction, has not only the perpendicular component but also the in-plane component in the direction (rightward direction in FIG. 3) opposite to the moving direction 14 of the writing head 11. Therefore, the magnetization is effected in the same direction as the direction of the recording magnetic field 13 at the downstream position from the writing head 11 (magnetization 54b in FIG. 3) in the area of the in-plane magnetized layer 5 under the recording magnetic domain 74 magnetized by the recording magnetic field 13 at the downstream position from the writing head 11. When the writing head 11 further travels to weaken the influence of the recording magnetic field 13, the in-plane magnetization is formed in the same direction as that of the in-plane component of the magnetization 54b, i.e., in the direction opposite to the moving direction 14 of the writing head 11 without being affected by the magnetization of the recording layer 7 as indicated by the magnetization 54c of the in-plane magnetized layer 5 under the recording magnetic domain 74 in FIG. 3, because the in-plane magnetized layer 5 has the strong in-plane magnetic anisotropy. On the other hand, when the recording magnetic field 12 of the writing head 11 is directed upwardly, the in-plane magnetization, which is in the same direction (leftward direction in FIG. 3) as the moving direction 14 of the writing head 11, is formed in the in-plane magnetized layer 5 (for example, magnetization 51c in FIG. 3).

In the magnetic recording medium of the present invention, the coercivity of the in-plane magnetized layer 5 in the in-plane direction is larger than the magnetic field generated by the residual magnetization in the perpendicular direction of the recording layer 7. Therefore, as shown in FIG. 3, the magnetic flux reflux structure is not formed between the recording layer 7 and the in-plane magnetized layer 5, and the mirror image phenomenon is not caused as well.

In the magnetic recording medium of the present invention, as shown in FIG. 3, the positive or negative magnetic charge is generated, because the in-plane magnetizations in the mutually opposite directions are superimposed in the in-plane magnetized layer 5 under the boundary area between the recording magnetic domains formed such that the magnetizations in the opposite directions are formed adjacently in the recording layer 7. As a result, the mirror image magnetic charge, which counteracts the magnetic charge of the in-plane magnetized layer 5, is generated in the area of the soft magnetic back layer 3 formed under the area in which the positive or negative magnetic charge is generated in the in-plane magnetized layer 5. For example, the positive magnetic charge 54a is generated in the area of the in-plane magnetized layer 5 under the boundary between the recording magnetic domain 71 and the recording magnetic domain 74 in FIG. 3. Therefore, the negative mirror image magnetic charge 34a is generated on the surface of the soft magnetic back layer 3 on the side of the in-plane magnetized layer 5 formed under the area. That is, these magnetic charges are counteracted with each other, and hence little influence is exerted on the output.

In the magnetic recording medium of the present invention, it is preferable that a relationship of $Mr_1T_1 > 2Mr_2T_2$ holds provided that $Mr_1$ represents the residual magnetization in the perpendicular direction of the recording layer, $T_1$ represents a thickness of the recording layer, $Mr_2$ represents the residual magnetization in the in-plane direction of the in-plane magnetized layer, and $T_2$ represents a thickness of the in-plane magnetized layer.

The leak magnetic field from the recording magnetic domain is proportional to $Mr_1T_1$ provided that $Mr_1$ represents the residual magnetization in the perpendicular direction of the recording layer and $T_1$ represents the thickness of the recording layer. On the other hand, the leak magnetic field, which is obtained from the magnetic charge (for example, magnetic charge 54a in FIG. 3) generated in the area of the in-plane magnetized layer under the boundary area between the recording magnetic domains with the magnetizations in the opposite directions formed adjacently in the recording layer, has a value proportional to $2Mr_2T_2$ provided that $Mr_2$ represents the residual magnetization of the in-plane magnetized layer and $T_2$ represents the thickness of the in-plane magnetized layer, because the in-plane magnetizations in the mutually opposite directions are superimposed in the area of the in-plane magnetized layer.

When the high density is further advanced, the boundary spacing distance between the recording magnetic domains with the magnetizations in the opposite directions formed adjacently in the recording layer is also narrowed. Therefore, it is feared that the mirror image effect, which is generated between the in-plane magnetized layer and the soft magnetic back layer as shown in FIG. 3, does not follow. In such a case, if the magnitude of $Mr_1T_1$ is not more than $2Mr_2T_2$, it is feared that the leak magnetic field from the upper surface of the recording magnetic domain of the recording layer is counteracted by the leak magnetic field from the in-plane magnetized layer, and the detection cannot be performed. Therefore, in the magnetic recording medium of the present invention, it is preferable to form the recording layer and the in-plane magnetized layer so that the relationship of $Mr_1T_1 > 2Mr_2T_2$ is established.

It is preferable that a CoCr-based alloy, especially CoCrPtB is used for the in-plane magnetized layer of the magnetic recording medium of the present invention. It is preferable that the coercivity of the in-plane magnetized layer in the in-plane direction is larger than the magnetic field generated by the residual magnetization of the recording layer and smaller than the magnetic field formed by the writing head. It is preferable that the thickness of the in-plane magnetized layer is thinner.

It is preferable that a Co/Pd artificial lattice film, a Co/Pt artificial lattice film, a Co-Cr-based polycrystalline film, an ordered alloy film composed of Fe/Pt or Co/Pt or the like is used for the recording layer of the magnetic recording medium of the present invention.

It is preferable that the magnetic recording medium of the present invention further includes a seed layer for controlling, for example, the crystalline orientation and the grain size of the recording layer between the recording layer and the in-plane magnetized layer. The material to be used for the seed layer differs depending on the material to be used for the recording layer. However, for example, when the Co/Pd artificial lattice film is used for the recording layer, it is preferable to use, for example, PdB or Pd—Ni/Si for the seed layer.

It is preferable that the magnetic recording medium of the present invention further includes a crystal control layer to control the crystalline orientation of the in-plane magnetized layer between the in-plane magnetized layer and the soft magnetic back layer. The material to be used for the crystal control layer differs depending on the material to be used for the in-plane magnetized layer. However, for example, when the in-plane magnetized layer is formed of the CoCr-based alloy, it is preferable to use, for example, Cr, CrTi, CrMo, or CrV for the crystal control layer.

According to a second aspect of the present invention, there is provided a magnetic recording apparatus including the magnetic recording medium according to the first aspect, a magnetic head which records or reproduces information on the magnetic recording medium, and a drive unit which drives the magnetic recording medium relative to the magnetic head.

According to the magnetic recording medium of the present invention, the coercivity of the in-plane direction of the in-plane magnetized layer formed between the recording layer and the soft magnetic back layer is larger than the magnetic field generated by the residual magnetization in the perpendicular direction of the recording layer (magnetic field generated by the surface magnetic charge of the recording layer). Therefore, the reflux structure of the magnetic flux is not generated between the recording layer and the in-plane magnetized layer, and the mirror image phenomenon is not caused as well. According to the magnetic recording medium of the present invention, it is possible to reduce the change of the influence on the reproduction output caused by the mirror image effect of the soft magnetic back layer depending on the recording density. Therefore, it is possible to decrease the difference between the reproduction output of the magnetic recording medium at the low recording density and the reproduction output of the magnetic recording medium at the high recording density. It is possible to improve the resolution.

According to the magnetic recording apparatus of the present invention, information can be reproduced at the higher resolution, because the magnetic recording medium of the present invention is used.

Example of the magnetic recording medium of the present invention will be specifically explained below with reference to the drawings. However, the present invention is not limited thereto.

EXAMPLE

Figure 4:
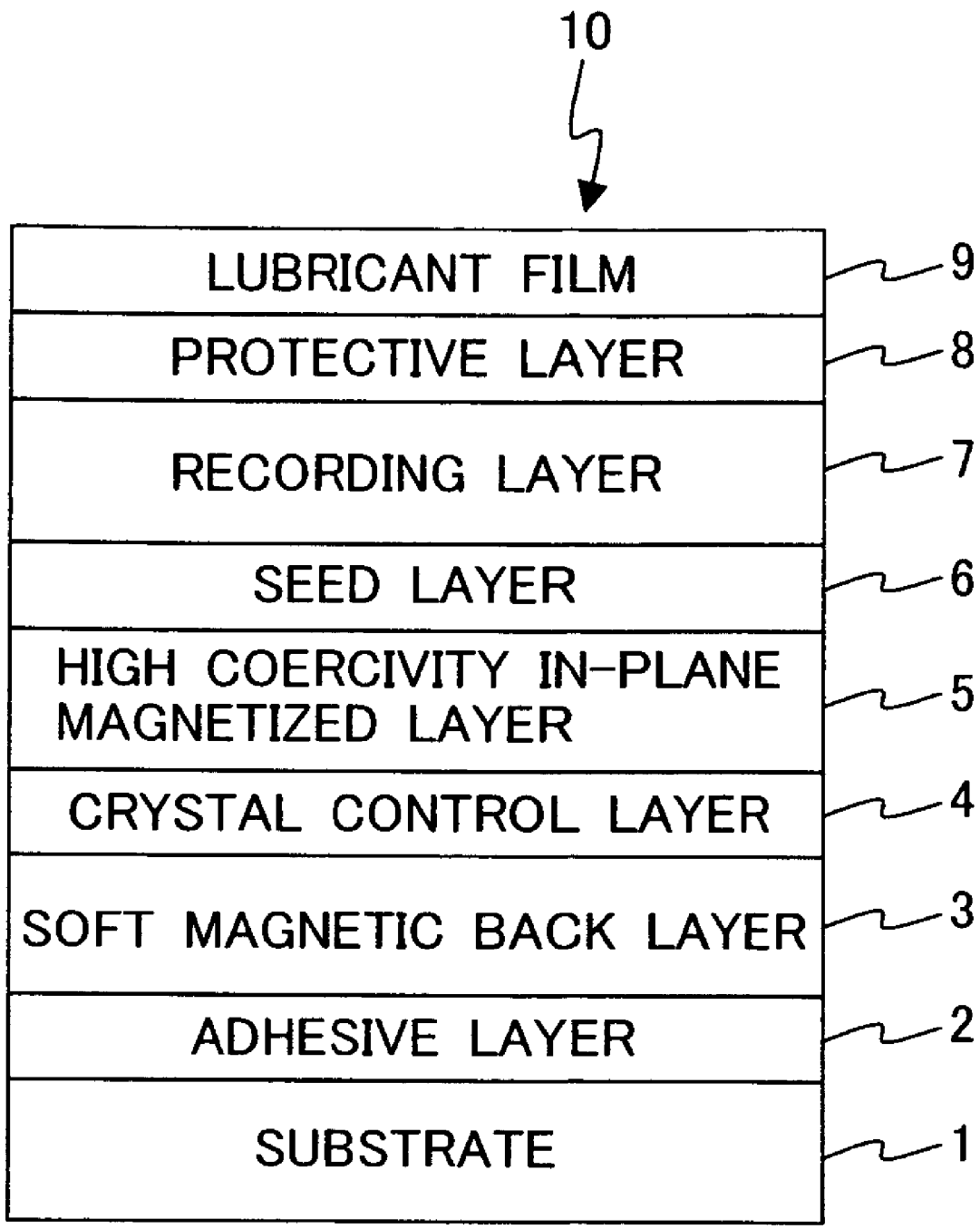
FIG. 4 shows a schematic sectional view illustrating a magnetic recording medium manufactured in Example.

FIG. 4 shows a schematic sectional view illustrating a magnetic recording medium manufactured in this embodiment. As shown in FIG. 4, the magnetic recording medium 10 manufactured in this embodiment has a structure including an adhesive layer 2, a soft magnetic back layer 3, a crystal control layer 4, a high coercivity in-plane magnetic layer 5, a seed layer 6, a recording layer 7, a protective layer 8, and a lubricant film 9 which are successively stacked or laminated on a substrate 1. The magnetic recording medium 10 having the stacked structure as described above was manufactured in accordance with the following method.

At first, a glass substrate was prepared as the substrate 1. Ti was formed to have a thickness of 5 nm as the adhesive layer 2 on the substrate 1 by the sputtering.

Subsequently, FeCoB was formed to have a thickness of 100 nm as the soft magnetic back layer 3 on the adhesive layer 2 by the sputtering.

Subsequently, $Cr_{80}MO_{20}$ was formed to have a thickness of 3 nm as the crystal control layer 4 on the soft magnetic back layer 3 by the sputtering. The crystal control layer 4 is a layer to control the crystalline orientation of the high coercivity in-plane magnetic layer 5 as described later on, which has a function to direct the magnetic anisotropy of the high coercivity in-plane magnetic layer 5 in the in-plane direction.

Subsequently, $CO_{62}Cr_{22}Pt_{12}B_4$ was formed to have a thickness of 10 nm as the high coercivity in-plane magnetic layer 5 on the crystal control layer 4 by the sputtering.

Further, $Pd_{50}B_{50}$ was formed to have a thickness of 3 nm as the seed layer 6 on the high coercivity in-plane magnetic layer 5 by the sputtering.

Subsequently, the recording layer 7 having an artificial lattice structure was formed on the seed layer 6 by the sputtering. When the recording layer 7 was formed, twenty layers of Co layers each having a thickness of 0.15 nm and twenty layers of Pd layers each having a thickness of 0.8 nm were alternately stacked.

Subsequently, amorphous carbon was formed to have a thickness of 3 nm as the protective layer 8 on the recording layer 7 by the plasma CVD method. After forming the protective layer 8, the substrate was taken out from the film formation apparatus. Finally, a perfluoropolyether-based lubricant was formed to have a thickness of 1 nm as the lubricant film 9 on the protective layer 8 by the solution immersion method. Thus, the magnetic recording medium 10 having the stacked structure shown in FIG. 4 was manufactured.

The residual magnetization Mr in the vertical direction of the recording layer 7 of the magnetic recording medium 10 manufactured in accordance with the production method described above was measured by the residual magnetization measurement with VSM (vibrating sample type magnetometer). As a result, the residual magnetization Mr was 325 emu/cc. After removing the protective layer 8 and the recording layer 7 by the etching, the coercivity in the in-plane direction of the high coercivity in-plane magnetic layer 5 was measured by using an in-plane Kerr effect magnetometer. As a result, a value of 4,100 Oe was obtained.

In the cgs-gauss unit system, a relationship of $B=H+4\pi M$ holds in relation to the magnetic flux density B (unit: Gauss), the magnetic field H (unit: Oe), and the magnetization M (unit: emu/cc). The magnetic field, which is generated by the magnetization M, is $4\pi M$ (unit: Oe). Therefore, the magnetic field, which is generated by the residual magnetization Mr of the recording layer 7, is 4,082 Oe, because the residual magnetization Mr in the vertical direction of the recording layer 7 of the magnetic recording medium 10 manufactured in this embodiment is 325 emu/cc. That is, in the case of the magnetic recording medium manufactured in this embodiment, the coercivity (4,100 Oe) of the high coercivity in-plane magnetic layer 5 in the in-plane direction is larger than the magnetic field (4,082 Oe) induced by the residual magnetization in the vertical direction of the recording layer 7. Therefore, it is considered that the magnetization of the high coercivity in-plane magnetic layer 5 is not rotated by the perpendicular magnetization of the recording layer 7. Further, it is considered that the magnetic flux is not refluxed between the recording layer 7 and the high coercivity in-plane magnetic layer 5 because of the same reason.

COMPARATIVE EXAMPLE

A magnetic recording medium, which was not provided with the high coercivity in-plane magnetic layer, was manufactured as Comparative Example. In the case of the magnetic recording medium of Comparative Example, the numbers of films to be alternately stacked for the Co layers and the Pd layers of the recording layer were 16 respectively, in order to obtain the reproduction output equivalent to that of the magnetic recording medium of Example. The magnetic recording medium was manufactured in the same manner as in Example except for the changed points described above.

Recording and Reproduction Characteristics

The magnetic recording media manufactured in Example and Comparative Example were installed respectively to a magnetic recording apparatus (not shown) including a composite head provided with a single magnetic pole type writing element and a GMR reading element, a spin stand, and a drive unit for driving the magnetic recording medium with respect to the composite head. Respective recording and reproduction characteristics were measured and compared. However, the single magnetic pole writing element had a main magnetic pole width of 72 nm, the GMR reading element had a width of 54 nm, and the shield gap was 40 nm. The distance (magnetic spacing) ranging from the surface of the single magnetic pole reading element to the interface between the recording layer and the protective layer of the magnetic recording medium was 10 nm, and the relative velocity of the magnetic recording medium with respect to the composite head was 9.7 m/sec.

Figure 5:
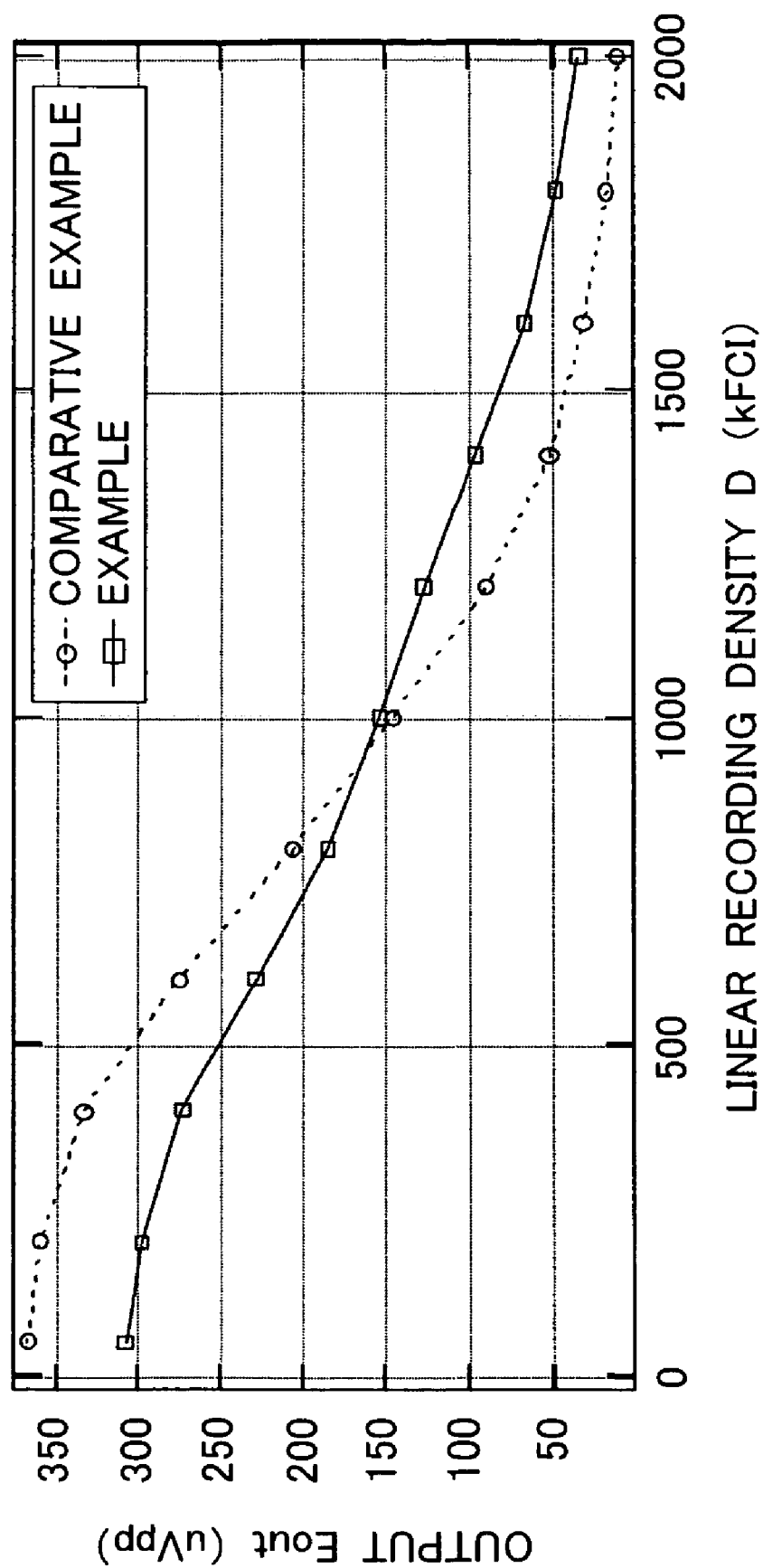
FIG. 5 shows the change of the reproduction output Eout with respect to the linear recording density D in relation to magnetic recording media of Example and Comparative Example.
Figure 6:
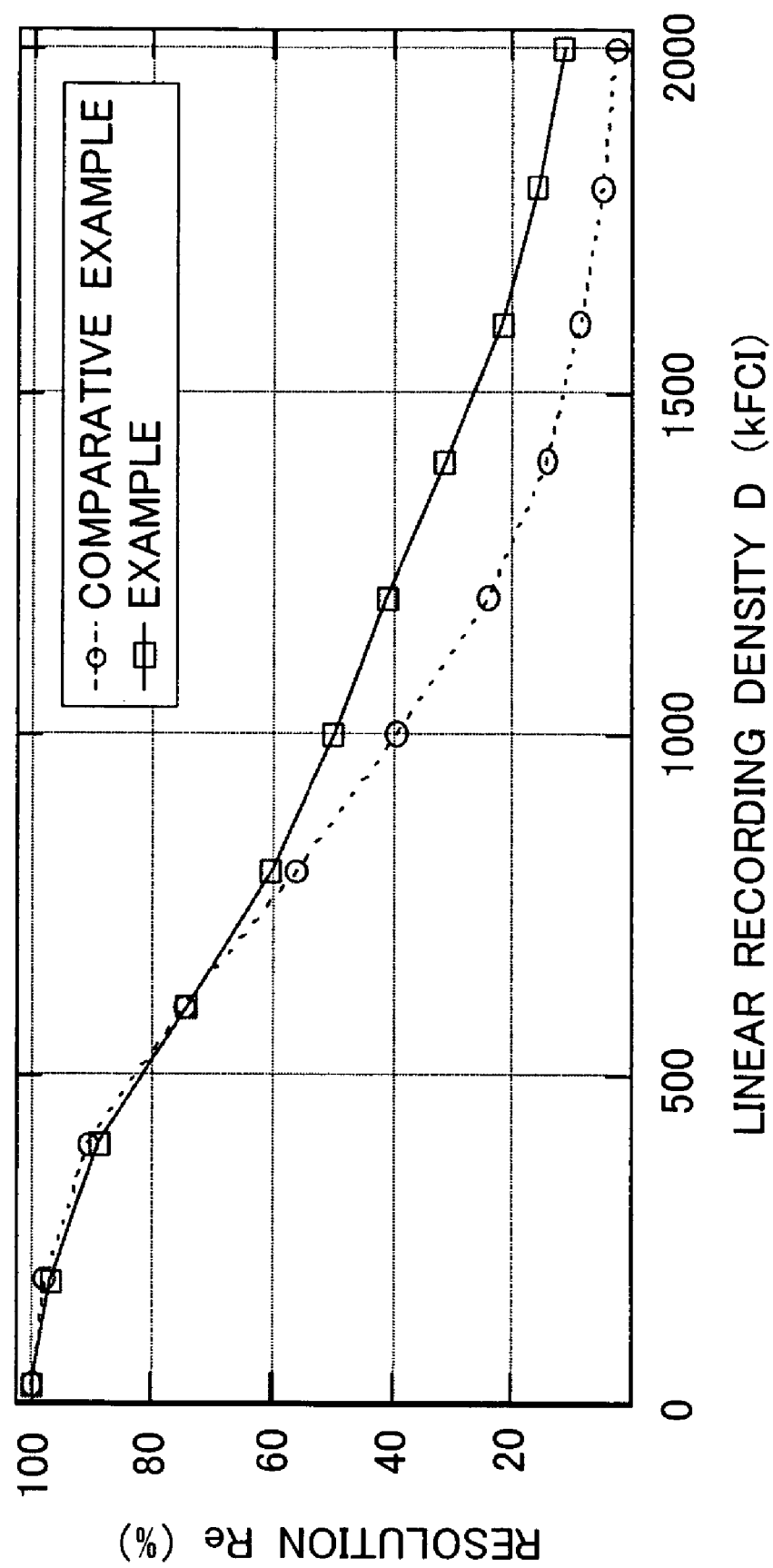
FIG. 6 shows the change of the resolution Re with respect to the linear recording density D in relation to magnetic recording media of Example and Comparative Example.

A continuous reversing pattern was recorded on each of the magnetic recording media manufactured in Example and Comparative Example while changing the linear recording density D within a range of 50 kFCI to 2,000 kFCI with the magnetic recording apparatus. After that, the recording and reproduction characteristics at respective linear recording densities D were measured and evaluated. Obtained results are shown in FIGS. 5 and 6. FIG. 5 shows the dependency of the output Eout of the measured all ones waveform on the linear recording density (roll off curve). FIG. 6 shows the dependency of the resolution Re on the linear recording density (roll off curve of resolution). In this case, the resolution Re represents the reproduction output normalized with the isolated read waveform output. In FIG. 6, the solution Re is the value of (reproduction output at each linear recording density/reproduction output at 50 kFCI)× 100 [%]. In FIGS. 5 and 6, graphs indicated by solid lines represent the recording and reproduction characteristics of the magnetic recording medium manufactured in Example, and graphs indicated by broken lines represent the recording and reproduction characteristics of the magnetic recording medium manufactured in Comparative Example.

As clarified from the result shown in FIG. 5, the following fact has been revealed. That is, the recording magnetic domains are small-sized as the linear recording density D is increased in both of Example and Comparative Example, and hence the reproduction output Eout is decreased. However, the difference between the reproduction output at the low recording density and the reproduction output Eout at the high recording density in the magnetic recording medium manufactured in Example is smaller than that in Comparative Example.

According to FIG. 6, the following fact has been revealed. That is, when the linear recording density D is not less than about 800 kFCI, the resolution Re is higher in the magnetic recording medium of Example than in the magnetic recording medium of Comparative Example. Further, the following fact has been revealed. That is, when the linear recording density D is about 2,000 kFCI, the resolution Re of the magnetic recording medium of Example is about 4.5 times the resolution Re of the magnetic recording medium of Comparative Example.

According to the results described above, the following fact has been revealed. That is, the resolution at the high recording density is improved by providing the high coercivity in-plane magnetic layer having the coercivity in the in-plane direction larger than the magnetic field generated by the residual magnetization in the perpendicular direction of the recording layer between the recording layer and the soft magnetic back layer, probably for the following reason. That is, it is considered that the mirror image effect of the soft magnetic back layer does not follow the magnetization reversal of the recording layer, and the reproduction output is lowered as the recording density is increased in the case of the magnetic recording medium of Comparative Example as explained with reference to FIG. 1, while in the case of the magnetic recording medium of Example, as explained with reference to FIG. 3, the change of the influence on the reproduction output is reduced owing to the mirror image effect of the soft magnetic back layer depending on the recording density, and hence the decrease in reproduction output, which is caused by the mirror image effect of the soft magnetic back layer at the high recording density, is suppressed.

In the magnetic recording medium of the present invention, it is possible to reduce the change of the influence on the reproduction output caused by the mirror image magnetic charge of the soft magnetic back layer depending on the recording density. Therefore, it is possible to decrease the difference between the reproduction output of the magnetic recording medium at the low recording density and the reproduction output of the magnetic recording medium at the high recording density, and it is possible to improve the resolution. In the magnetic recording apparatus of the present invention, it is possible to reproduce information at the high resolution in the wider range of the recording density, because the magnetic recording medium of the present invention is used. Therefore, the magnetic recording medium and the magnetic recording apparatus of the present invention are preferably usable as a magnetic recording medium and a magnetic recording apparatus capable of responding to the way of use and the standard in wider ranges.

What is claimed is:

1. A magnetic recording medium comprising:
   a substrate;
   a back layer which is formed on the substrate and which is formed of a soft magnetic material;
   an in-plane magnetized layer which is formed on the back layer and which has in-plane magnetization; and
   a recording layer which is formed on the in-plane magnetized layer and which has perpendicular magnetization, wherein:
   the in-plane magnetized layer has a coercivity in an in-plane direction which is larger than a magnetic field generated by residual magnetization in a perpendicular direction of the recording layer.

2. The magnetic recording medium according to claim 1, wherein a relationship of Mr1T1>2Mr2T2 holds provided that Mr1 represents the residual magnetization in the perpendicular direction of the recording layer, T1 represents a thickness of the recording layer, Mr2 represents the residual magnetization in the in-plane direction of the in-plane magnetized layer, and T2 represents a thickness of the in-plane magnetized layer.

3. The magnetic recording medium according to claim 1, wherein the in-plane magnetized layer is formed of CoCr-based alloy.

4. The magnetic recording medium according to claim 3, wherein the CoCr-based alloy is CoCrPtB.

5. The magnetic recording medium according to claim 1, wherein the recording layer is one selected from a group consisting of a Co/Pd artificial lattice layer, a Co/Pt artificial lattice layer, a Co-Cr-based polycrystalline layer, and a ordered lattice alloy layer composed of Fe/Pt or Co/Pt.

6. The magnetic recording medium according to claim 1, further comprising a seed layer between the recording layer and the in-plane magnetized layer.

7. The magnetic recording medium according to claim 1, further comprising a crystal control layer which controls crystalline orientation of the in-plane magnetized layer and which is disposed between the in-plane magnetized layer and the back layer.

8. A magnetic recording apparatus comprising the magnetic recording medium as defined in claim 1, a magnetic head which records information on the magnetic recording medium, and a drive unit which drives the magnetic recording medium relative to the magnetic head.

9. The magnetic recording medium according to claim 1, further comprising a crystal control layer provided between the in-plane magnetized layer and the back layer.

* * * * *

UNITED STATES PATENT AND TRADEMARK OFFICE
CERTIFICATE OF CORRECTION

PATENT NO.         : 7,348,077 B2
APPLICATION NO.    : 10/930755
DATED              : March 25, 2008
INVENTOR(S)        : Enji Fujita et al.

It is certified that error appears in the above-identified patent and that said Letters Patent is hereby corrected as shown below:

Please delete the following:

(73)    Assignee:  Hitachi Maxwell Ltd, Osaka (JP)

and Replace with:

(73)    Assignee: Hitachi Maxell Ltd., Osaka (JP)

Signed and Sealed this

Fifth Day of August, 2008

JON W. DUDAS
*Director of the United States Patent and Trademark Office*